United States Patent
Lee et al.

(10) Patent No.: US 6,606,256 B1
(45) Date of Patent: Aug. 12, 2003

(54) HARD DISK RETENTION BRACKET

(75) Inventors: Jen-Hsiang Lee, Taipei (TW); Ching-Yuan Wang, Taipei (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 10/164,094

(22) Filed: Jun. 5, 2002

(51) Int. Cl.[7] .................................................. H02B 1/01
(52) U.S. Cl. ........................ 361/825; 361/752; 361/753; 361/728; 361/801; 361/727; 361/685; 361/683
(58) Field of Search .................................. 361/683, 685, 361/726, 727, 825, 728, 801, 798, 797, 752, 753

(56) References Cited

U.S. PATENT DOCUMENTS 6,064,568 A * 5/2000 Schmitt ....................... 361/685
6,325,353 B1 * 12/2001 Jiang .......................... 248/682

* cited by examiner

*Primary Examiner*—David Martin
*Assistant Examiner*—Thanh Yen Tran

(57) ABSTRACT

A hard disk retention bracket adapted for a computer system is disclosed. The hard disk retention bracket comprises a base panel, the first side panel and the second side pane. The base panel includes a V-shaped opening. The uprising hook on the bottom base of the housing hooks the hard disk retention bracket by transpiercing the V-shaped opening. The first side panel is connected to a first side of the base panel. The second side panel is connected to a second side of the base panel. The first side panel and the second side panel are parallel and facing to each other. The front door comprises a latch, near the second side panel, controlled by a sliding bottom. The latch is locked in the notch of the second side panel, while the sliding bottom is released. The latch is removed from the notch and the front door can be opened while the sliding bottom is pushed. The front door further comprises an extension, which extends from the front door toward the rear end and parallel to the base panel. The extension comprises an U-shaped opening. During the closing the front door, the prominence slides into the U-shaped opening. While the front door is locked, the prominence engages in the U-shaped opening and restricts the movement of the hard disk retention bracket.

20 Claims, 6 Drawing Sheets

HARD DISK RETENTION BRACKET

BACKGROUND OF THE INVENTION

1. Field of the Invention

The invention relates in general to a hard disk retention bracket, and more particularly to a hard disk retention bracket used in a server.

2. Description of the Related Art

When designing a computer many factors must be considered. Some technical considerations are: processor speed, bus size, memory requirements, and the physical size of the computer housing. When positioning components within the computer housing it is desirable to position some components such that they are easily removable assembled by a user or technician. An example of such a component is a hard disk.

Disk brackets secure disks to the computer housing. It is often desirable to design disk brackets to permit a user or a technician to easily secure the hard disks to the housing and to permit the hard disks to be easily removed from the housing. Hard disks are usually secured within the disk bracket. This bracket is then secured to the housing. Typically, the bracket is secured to the housing via screws or bolts that are inserted through the bracket and into the housing. This method has many disadvantages. When removing the hard disk bracket, screws are periodically misplaced. If all of the screws are not used to attach the bracket to the computer housing, the bracket may not be secure. If the hard disk bracket is not secure, the hard disk may vibrate excessively. Such vibration may damage the hard disk and components adjacent to the hard disk or may adversely affect data storage and retrieval.

Another disadvantage of using screws or bolts to secure the hard disk bracket to the housing is that when replacing the hard disk, the user or the technician must physically unscrew each screw in order to disengage the hard disk bracket from the housing. Such a process is tedious and time consuming.

What is needed is a self contained disk bracket which enables the user to quickly and efficiently secure the hard disk bracket to the housing and to quickly and efficiently disengage the hard disk bracket from the housing. The present invention is directed to overcoming, or at least reducing the effects of, one or more of the problems set forth above.

SUMMARY OF THE INVENTION

It is therefore an object of the invention to provide a hard disk retention bracket adapted for a computer system comprising a base panel, the first side panel and the second side pane. The base panel includes a V-shaped opening. The uprising hook on the bottom base of the housing hooks the hard disk retention bracket by transpiercing the V-shaped opening. The first side panel is connected to a first side of the base panel. The second side panel is connected to a second side of the base panel. The first side panel and the second side panel are parallel and facing to each other. The front door comprises a latch, near the second side panel, controlled by a sliding bottom. The latch is locked in the notch of the second side panel, while the sliding bottom is released. The latch is removed from the notch and the front door can be opened while the sliding bottom is pushed. The front door further comprises an extension, which extends from the front door toward the rear end and parallel to the base panel. The extension comprises an U-shaped opening. During the closing the front door, the prominence slides into the U-shaped opening. While the front door is locked, the prominence engages in the U-shaped opening and restricts the movement of the hard disk retention bracket.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
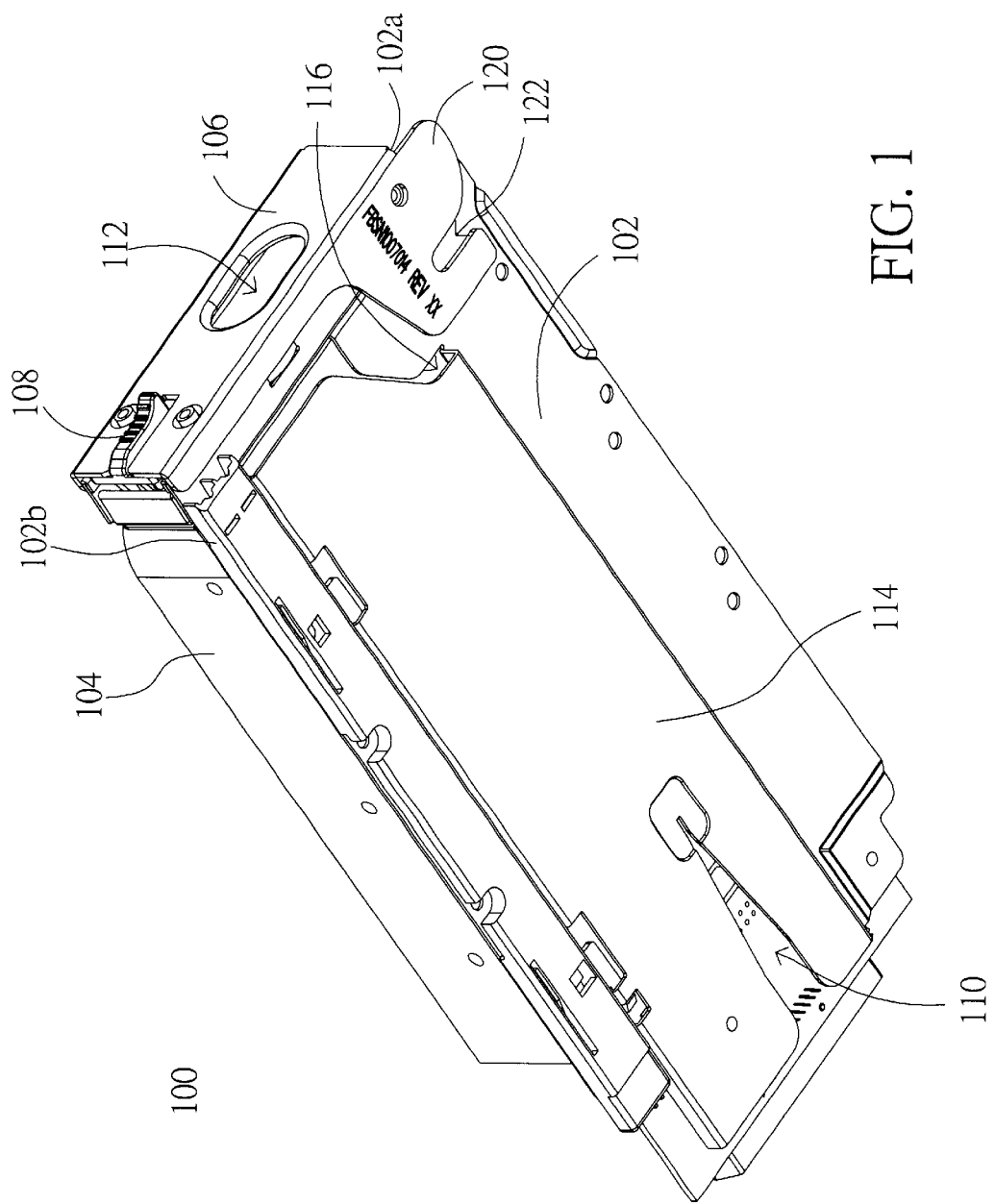
FIG. 1 is the bottom view of a hard disk retention bracket according to a preferred embodiment of the invention.
Figure 2:
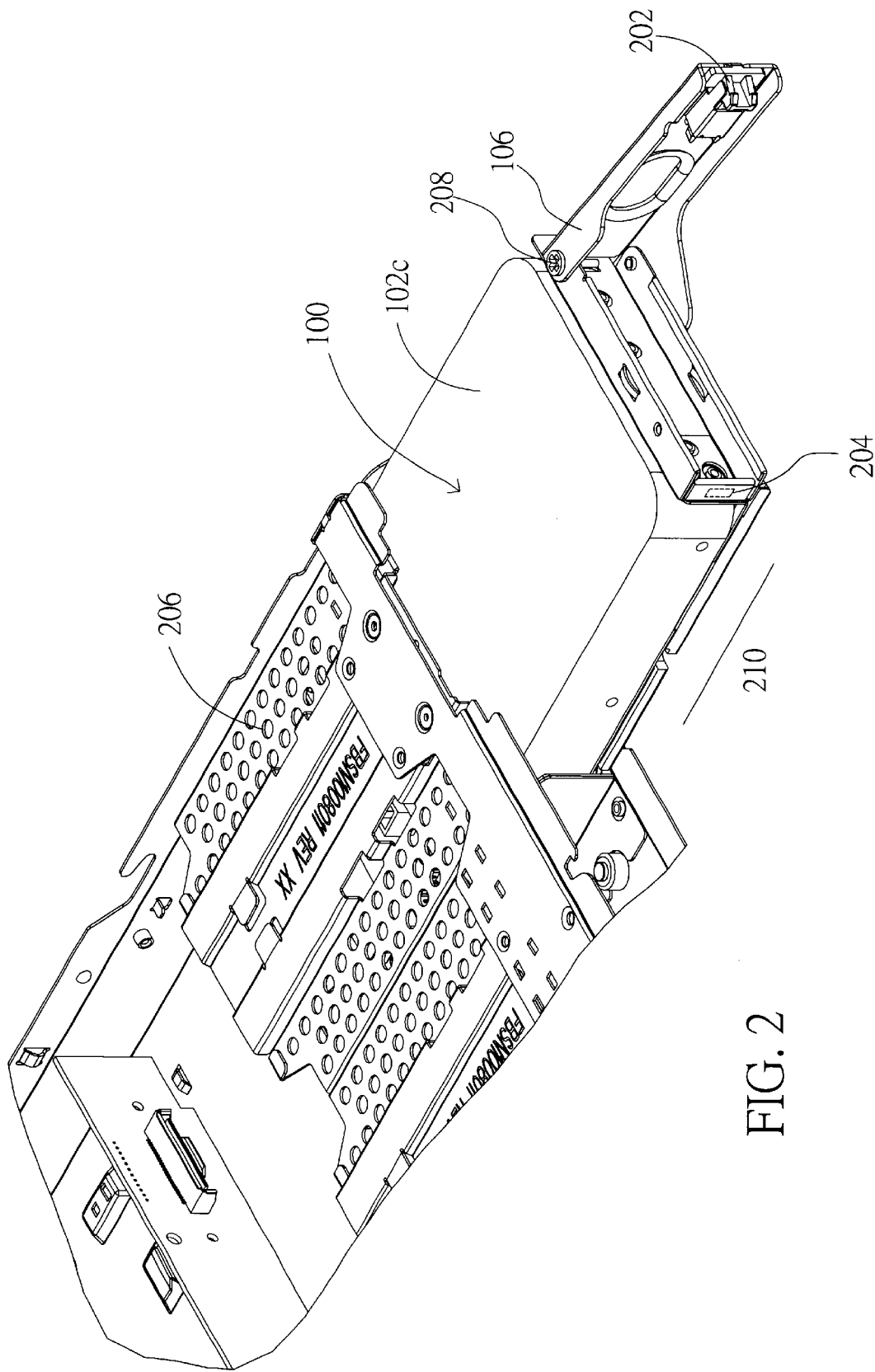
FIG. 2 to FIG. 6 show the operation of inserting the hard disk retention bracket into the housing and removing it therefrom.

FIG.1 is the bottom view of a hard disk retention bracket according to a preferred embodiment of the invention. The hard disk retention bracket 100 includes at least a base panel 102, a first side panel (not shown) connected to the first side 102a of the base panel 102, a second side panel 104 connected to the second side 102b of the base panel 102, and a front door 106. The front door 106 is preferably connected to the other components of the hard disk retention bracket 100 by a hinge 208 (FIG. 2). The first side panel and the second side panel 104 are parallel and facing to each other. The hard disk retention bracket 100 of the invention preferably further includes a top panel 102c as shown in FIG. 2. The top panel 102c connects the first side panel and the second side panel 104 and is substantially parallel to the base panel 102.

Figure 4:
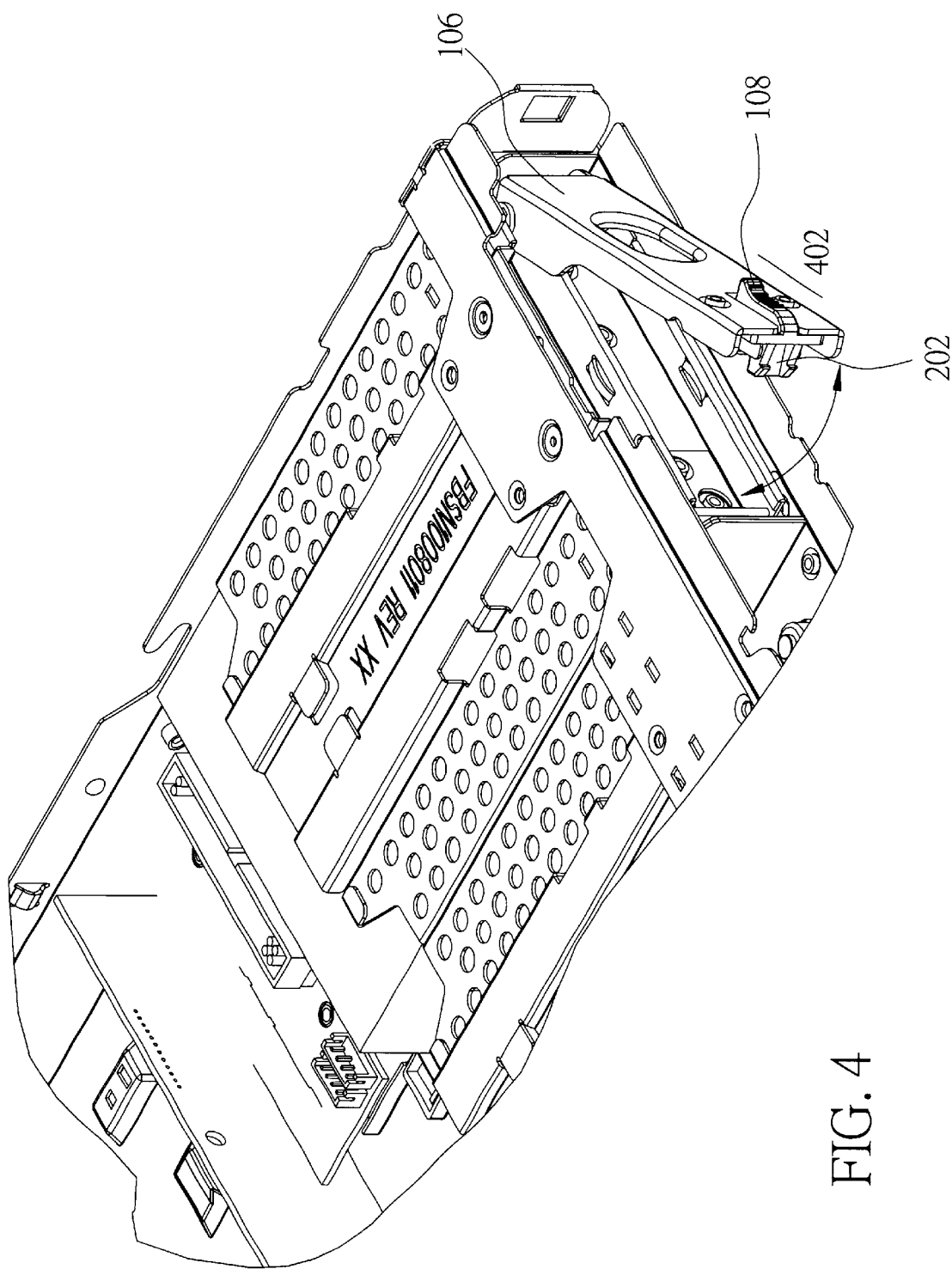

Referring to FIG. 1, three major characteristics of the hard disk retention bracket 100 of the invention are shown. First, the front door 106 comprises a mechanism beneficial for easy opening and easy locking. The front door 106 comprises a latch 202, as shown in FIG. 2. The latch 202 is controlled by a sliding bottom 108 (FIG. 4). The latch 202 and the sliding bottom 108 are both at a side near the second side panel 104. While the sliding bottom 108 is released, the latch 202 is locked in the notch 204 formed on the inner surface of the second side panel 104. While the sliding bottom 108 is pushed away from the second side panel 104 (FIG. 1), the latch 202 is removed from the notch 204 so that the front door 106 is unlocked and can be opened. The front door 106 can further comprises an opening 112. While the front door 106 is unlocked, the user can open the front door 106 by putting fingers into the opening 112 and pull the front door 106 away.

Figure 5:
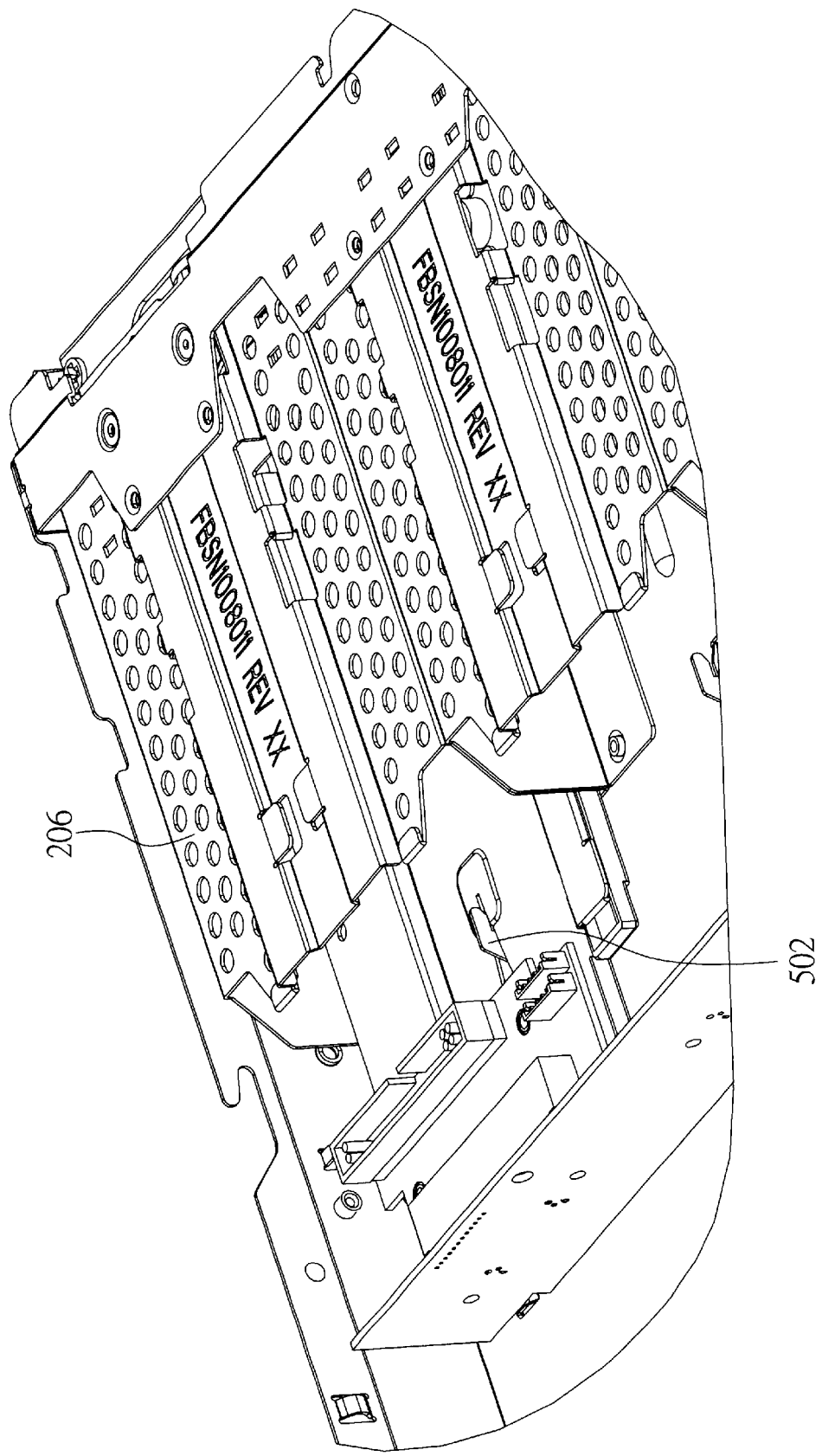

The other two major characteristics of the hard disk retention bracket 100 of the invention helps itself to firmly attached inside the housing 206 of the computer system. The first one is the V-shaped opening 110 on the base panel 102 (FIG. 1). The part 114 of the base panel 102, where the V-shaped opening 110 is located, is substantially away from the main body of the base panel 102, leaving a space 116 between the part 114 of the base panel 102 and the hard disk. An associated uprising hook 502, as shown in FIG. 5, on the bottom base (not shown) of the housing 206 hooks the hard disk retention bracket 100 by transpiercing the V-shaped opening 110, while the hard disk retention bracket 100 is fully inserted into the housing 206. The uprising hook 502 restricts the movement of the hard disk retention bracket 100.

Figure 3:
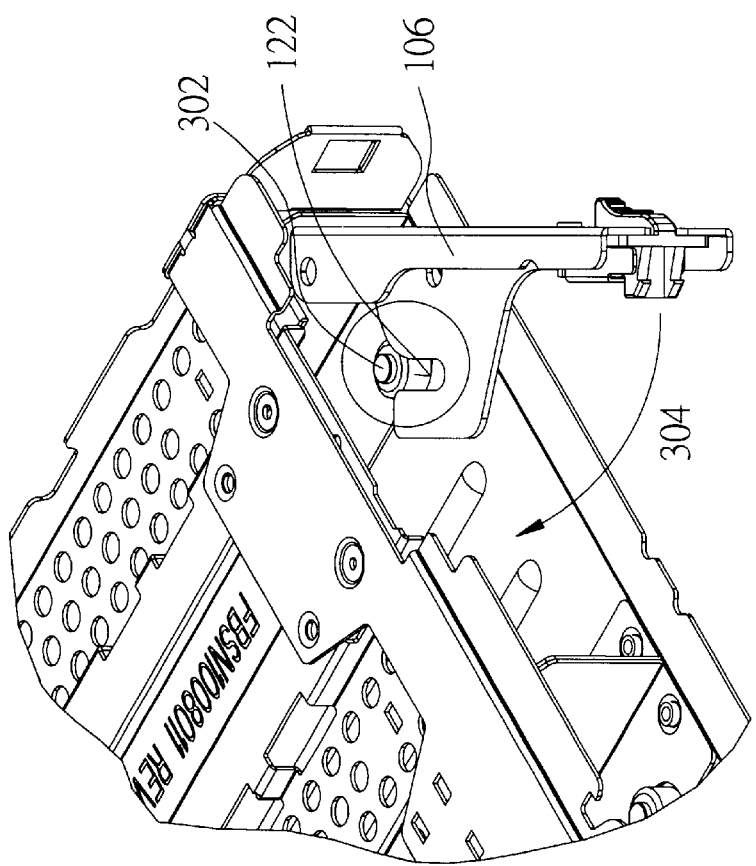

Another mechanism for restricting the movement of the hard disk retention bracket 100 is the extension 120 thereebeneath (FIG. 1). The extension 120 extends from the front door 106 toward the rear end and parallel to the base panel 102. The extension 120 is near the first side panel and connected to the front door 106 by the hinge 208 (FIG. 2). The extension 120 comprises an U-shaped opening 122. During the closing the front door 106, a prominence 302, as shown in FIG. 3, formed on the base of the housing 206, slides into the U-shaped opening 122. While the front door 106 is locked, the prominence 302 engages with the U-shaped opening 122 and restricts the movement of the hard disk retention bracket 100.

Figure 6:
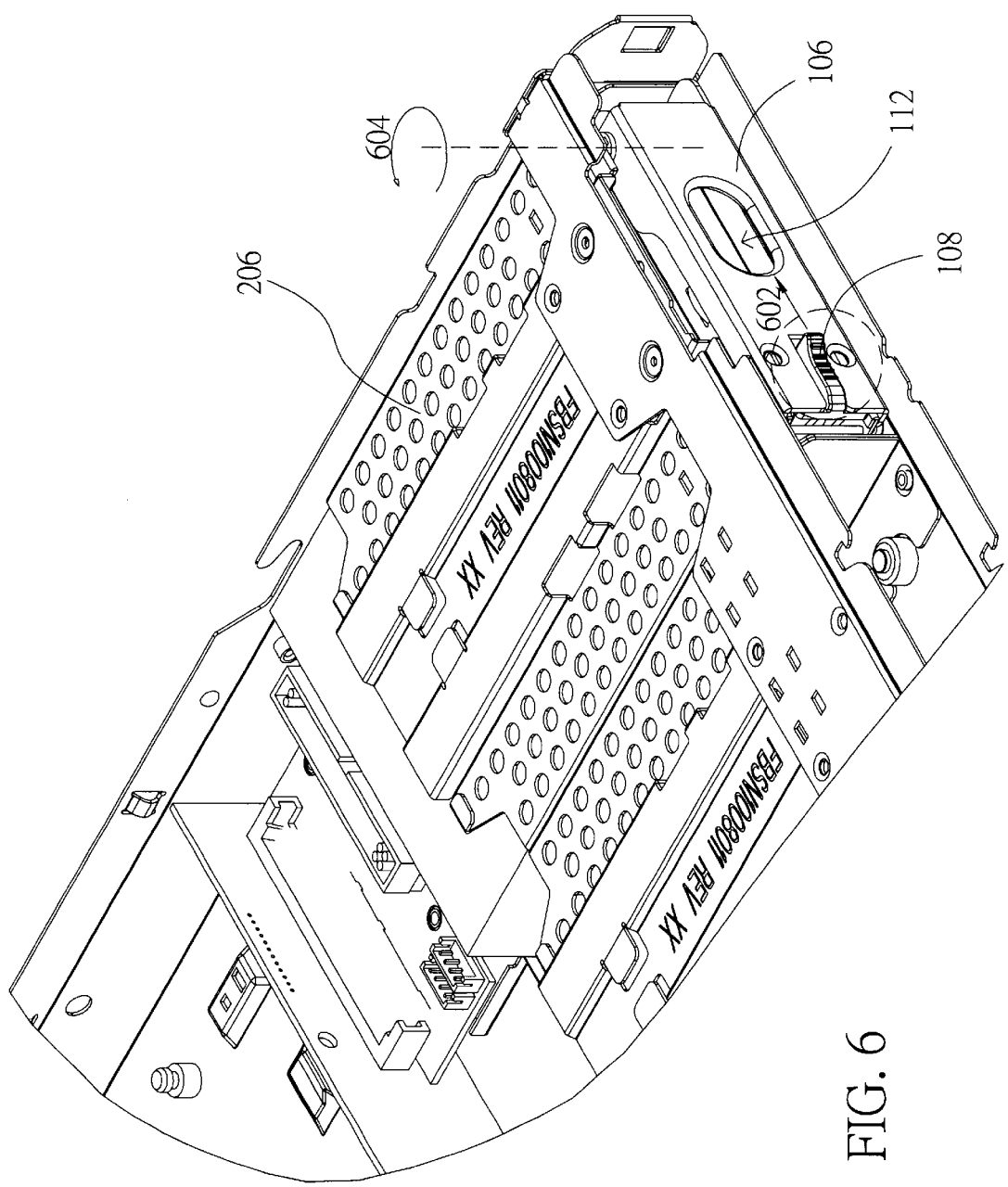

FIG. 2 to FIG. 6 show the operation of inserting the hard disk retention bracket 100 into the housing 206 and removing it therefrom. As shown in FIG. 2, the hard disk retention bracket 100 is pushing into the housing 206 along the arrow 210 (FIG. 2). At this moment, the front door 106 is opened. While the hard disk retention bracket 100 is approximately fully inserted into the housing 206, the front door 106 is closed along the arrow 304 (FIG. 3). During closing the front door 106, the prominence 302 on the base of the housing 206 slides into the U-shaped opening 122 (FIG. 3). While the front door 106 is locked, the prominence 302 engages with the U-shaped opening 122 and restricts the movement of the hard disk retention bracket 100, as shown in FIG. 3. Then, as shown in FIG. 4, nearly the full closure of the front door 106, the front door 106 can be locked by pushing the sliding bottom 108 along the arrow 402 and leasing the sliding bottom 108 while the front door 106 is fully closed. As a result, the latch 202 led by the sliding bottom 108 is locked in the notch 204 (FIG. 2). FIG. 5 shows that the uprising hook 502 hooks the hard disk retention bracket 100, while the hard disk retention bracket 100 is fully inserted. On the other hand, while the hard disk retention disk 100 is desired to be removed from the housing 206 of the computer system, such as a personal computer or a server, the user can push the sliding bottom 108 along the arrow 602 to unlock the front door, pull the front door 106 by hooking the opening 112 and then rotate along the arrow 604, as shown in FIG. 6.

It is therefore apparent that the hard disk retention bracket of the invention has the advantages including easy locking and unlocking and firm attachment.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hard disk retention bracket adapted for a computer system, wherein the computer system comprises a housing for the hard disk retention bracket to insert in, the hard disk retention bracket comprising:
   a base panel, the base panel comprising a V-shaped opening wherein the uprising hook on the bottom base of the housing hooks the hard disk retention bracket by transpiercing the V-shaped opening, a first side panel connected to a first side of the base panel;
   a second side panel connected to the base panel, comprising a notch near the front end of the second side panel; and
   a front door, which comprises a latch, near the second side panel, controlled by a sliding bottom, the latch being locked in the notch of the second side panel, while the sliding bottom is released; and the latch being removed from the notch and the front door being able to be opened while the sliding bottom is pushed.

2. The hard disk retention bracket as claimed in claim 1, wherein the front door further comprises an opening.

3. The hard disk retention bracket as claimed in claim 1, wherein the housing of the computer system comprises a bottom base with an uprising hook substantially at the center of a rear end of the housing, wherein the uprising hook on the bottom base of the housing hooks the hard disk retention bracket by transpiercing the V-shaped opening.

4. The hard disk retention bracket as claimed in claim 3, wherein the bottom base comprises a prominence substantially at one side of the front end of the housing.

5. The hard disk retention bracket as claimed in claim 1, wherein the front door further comprises an extension extending from the front door toward the rear end and parallel to the base panel, the extension comprising an U-shaped opening, during the closing the front door, the prominence sliding into the U-shaped opening and while the front door is locked, the prominence engaging in the U-shaped opening and restricting the movement of the hard disk retention bracket.

6. The hard disk retention bracket as claimed in claim 1, wherein the computer system is a server.

7. The hard disk retention bracket as claimed in claim 1, wherein the computer system is a personal computer.

8. The hard disk retention bracket as claimed in claim 1, the bracket further including a first side panel connected to the base panel;
   wherein the front door is connected to the first side panel by a hinge.

9. A hard disk retention bracket adapted for a computer system, wherein the computer system comprises a housing for the hard disk retention bracket to insert in, and a bottom base of the housing comprises an uprising hook substantially at the center of a rear end, and a prominence substantially near the front end of the housing, the hard disk retention bracket comprising:
   a base panel with a V-shaped opening, wherein the uprising hook on the bottom base of the housing hooks the hard disk retention bracket by transpiercing the V-shaped opening;
   a first side panel connected to a first side of the base panel;
   a second side panel connected to the second side of the base panel, wherein the first side panel and the second side panel are parallel and facing to each other; and
   a front door, comprising:
      an extension extending from the front door toward the rear end and parallel to the base panel, near the first side panel, the extension comprising an U-shaped opening, during the closing the front door, the prominence sliding into the U-shaped opening and while the front door is closed, the prominence engaging in the U-shaped opening and restricting the movement of the hard disk retention bracket.

10. The hard disk retention bracket as claimed in claim 9, wherein the second side panel further comprises a notch near the front end of the second side panel and the front door further comprises a latch, near the second side panel, controlled by a sliding bottom, the latch being locked in the notch of the second side panel, while the sliding bottom is released; and the latch being removed from the notch and the front door being able to be opened while the sliding bottom is pushed.

11. The hard disk retention bracket as claimed in claim 9, wherein the front door further comprises an opening.

12. The hard disk retention bracket as claimed in claim 9, wherein the computer system is a server.

13. The hard disk retention bracket as claimed in claim 9, wherein the computer system is a personal computer.

14. The hard disk retention bracket as claimed in claim 9, wherein the front door is connected to the first side panel by a hinge.

15. A hard disk retention bracket adapted for a computer system, wherein the computer system comprises a housing for the hard disk retention bracket to insert in, the hard disk retention bracket comprising:

a base panel, wherein a bottom base of the housing comprises an uprising hook substantially at the center of a rear end, and the base panel comprises a V-shaped opening, the uprising hook hooking on the V-shaped opening while the hard disk retention bracket is inserted into the housing;

a second side panel connected to a side of the base panel, comprising a notch near the front end of the second side panel; and a front door, which comprises a latch, near the second side panel, controlled by a sliding bottom, the latch being locked in the notch of the second side panel, while the sliding bottom is released; and the latch being removed from the notch and the front door being able to be opened while the sliding bottom is pushed.

16. The hard disk retention bracket as claimed in claim 15, wherein the a bottom base of the housing further comprises a prominence substantially at one side of the front end of the housing and the front door further comprises:

an extension extending from the front door toward the rear end and parallel to the base panel, the extension comprising an U-shaped opening, during the closing the front door, the prominence sliding into the U-shaped opening and while the front door is locked, the prominence engaging in the U-shaped opening and restricting the movement of the hard disk retention bracket.

17. The hard disk retention bracket as claimed in claim 15, wherein the front door further comprises an opening.

18. The hard disk retention bracket as claimed in claim 15, wherein the computer system is a server.

19. The hard disk retention bracket as claimed in claim 15, wherein the computer system is a personal computer.

20. The hard disk retention bracket as claimed in claim 15, the bracket further including a first side panel connected to the base panel;

wherein the front door is connected to the first side panel by a hinge.

* * * * *